A. SUNDH.
CONTROLLING APPARATUS.
APPLICATION FILED MAR. 20, 1914.
1,159,612.
Patented Nov. 9, 1915.
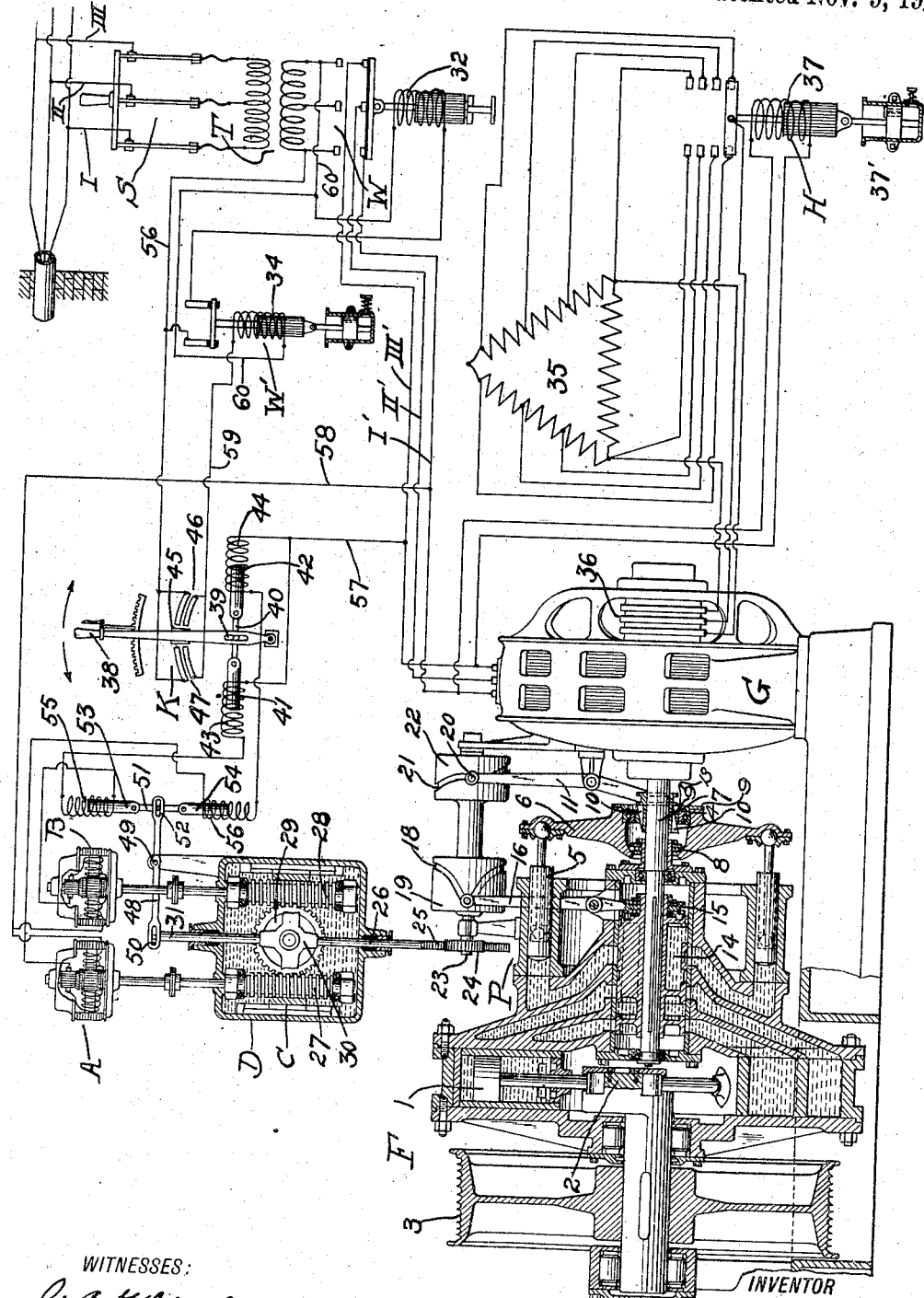
WITNESSES:
G. A. Klimek
G. Genzlinger
INVENTOR
August Sundh
BY
L. H. Campbell
ATTORNEY

UNITED STATES PATENT OFFICE.

AUGUST SUNDH, OF HASTINGS-UPON-HUDSON, NEW YORK, ASSIGNOR TO OTIS ELEVATOR COMPANY, A CORPORATION OF NEW JERSEY.

CONTROLLING APPARATUS.

1,159,612.  Specification of Letters Patent.  Patented Nov. 9, 1915.

Application filed March 20, 1914. Serial No. 825,955.

*To all whom it may concern:*

Be it known that I, AUGUST SUNDH, a citizen of the United States, residing in Hastings-upon-Hudson, in the county of Westchester and State of New York, have invented a new and useful Improvement in Controlling Apparatus, of which the following is a specification.

My invention relates to the control of variable speed power transmission mechanism, and is more particularly adapted to control mechanism of said character, having, as a prime mover, an alternating current electric motor.

One of the objects of the invention is to provide an inductive control system, for effecting the operation of the electric motor continuously under certain conditions as hereinafter described, and for controlling the starting, stopping and acceleration of the power transmission mechanism in either direction at will, and conjunctively with the electric motor.

A further object of the invention is to provide means to effect the continuous operation of the electric motor during the stopping periods of the power transmission mechanism, particularly in such cases where the latter is stopped frequently, as for example in elevator service, and further to provide means for automatically stopping the electric motor if the stopping period of the power transmission mechanism exceeds in time, a certain predetermined amount.

Other objects of the invention will appear more fully hereinafter, the novel combination of elements being set forth in the appended claims.

Essentially the invention consists in an inductive controlling apparatus for an alternating current electric motor and variable speed transmission mechanism, adapted to be driven thereby, comprising a fluid motor, and pumping mechanism for supplying fluid under pressure to the fluid motor, said mechanism being of the type having a speed and torque characteristic which vary in inverse ratio.

The herein following description relating to the power transmission mechanism will be brief, since the same is fully shown and described in detail in my co-pending application, Serial No. 764,994, filed May 2, 1913.

The fluid pressure motor P comprises a plurality of double acting cylinders whose pistons 1 are connected to a common crank pin 2. A driven member comprises a cable sheave 3 which is keyed to the crank shaft and is adapted to receive the hoisting cables of an elevator or other hoist, although if desired said sheave may be replaced by a belt pulley, gear, or other device whereby power may be transmitted from the crank shaft to any desired power consuming device.

The pump P is adapted to deliver fluid under pressure to the fluid motor F. The stroke of the pump plungers 5 is controlled by means of a tilting head 6, carried upon a shaft 7 in anti-friction bearings 8. The right hand end of the tilting head is provided on its inner circumference with a ball race 4, which is secured in place by means of a ring 9 and co-acting ball race 9', carried by a ring 13, which is concentric with the shaft 7, but is adapted to be shifted in an eccentric position with respect to the shaft 7, by means of a sliding key or wedge 10. The latter is arranged to slide longitudinally in a slot in the shaft by means of a lever 11, which is bifurcated at its lower end and has a pair of oppositely disposed pins which enter a circumferential groove in the part 12, which is integral with the key or wedge 10. By this arrangement the eccentricity of the ring 13 can be varied from zero to maximum in either direction by sliding the wedge lengthwise of the shaft by means of the lever 11. The length of the stroke of the plungers will obviously depend upon the amount of tilt or inclination given to the tilting head by means of the wedge, and since this factor may be varied at will, the output of the pump may be controlled within predetermined limits, or if desired, the pump may be arranged to reverse the direction of flow of fluid by moving the wedge in a right hand direction past center.

A rotary valve 14 is operated from the pump shaft and is adapted to have a sliding movement thereon. This valve directs the fluid between the pump and fluid motor. Means for imparting a sliding movement of the valve 14 upon the shaft 7 comprises a grooved collar 15, provided on either lateral face with ball thrust bearings which are secured to or carried upon the valves. A pivoted lever 16 has a pin on it which rides in the groove on said collar, the arrangement being such that the valve may be shifted longitudinally of the shaft by means of the lever 16, the latter is provided with a pin at its other end, which pin is adapted to ride in a cam slot 18 formed in the cam 19. The lever 11 by which the wedge 10 is shifted, is also provided with a pin 20, which rides in a cam slot 21 in the cam 22. The cams 19 and 22 are secured to a shaft 23, to which is keyed a gear wheel 24 which is engaged by a gear rack 25. Two pilot motors A and B are arranged to rotate in opposite directions, and are connected through a differential gear C to a stem 26 to which the gear rack 25 forms an integral part. The differential gear C comprises worm gears 27 and 28 which are coupled to and rotate with the armature shafts of the pilot motors A and B, respectively. A floating gear 29 meshes with the gears 27 and 28, and is supported in a guided bearing 30, to which the stems 26 and 31 are connected. The gearing C is contained in a suitable casing D, which is filled with lubricating oil which keeps the contents of the casing thoroughly lubricated.

A main line switch S connects the primary windings of the transformer T to the mains I, II and III.

An electromagnetic switch W controls the circuit to the stator windings of the motor G, which drives the shaft 7. The circuit for the winding 32 of the switch W is controlled by means of a switch W', having a dashpot 33 associated therewith adapted to retard the movement of the switch to open position; that is, when the winding 34 is de-energized, thus maintaining the circuit for the motor G closed, by way of the switch W, for a predetermined period of time after the stopping of the power transmission mechanism, as will be more fully described hereinafter.

A sectional resistance 35 is connected through the collector rings 36 to the rotor winding of the motor G. An accelerating magnet H is provided with a winding 37, which is connected across two of the motor mains, thus the switch H will operate in a well known manner to successively cut out the rotating resistance 35. A dashpot 37' is provided to retard the said cutting out operation of the switch H.

A master switch K comprises a pivoted switch lever 38 having a slot and pin connection 39 with a horizontal bar 40. To the ends of the bar are connected laminated cores 41 and 42, which extend substantially half way into the magnet windings or solenoids 43 and 44, respectively. A contact segment 45 is carried by the lever 38, and is adapted to span contact segments 46 when the lever 38 is moved toward the right, and contact segments 47 when moved toward the left.

An arm 48 pivoted at 49 is connected at one end by a slot and pin connection 50 to the pin 31, and the other end to a rod 51 by a slot and pin connection 52. To the ends of the rod 51 are connected laminated cores 53 and 54, which extend substantially half way into the magnet windings or solenoids 55 and 56, respectively.

The conductor 57 is common to one terminal of each of the solenoids 43 and 44 and is connected to the stator main III'. The solenoid 56 and pilot motor A are connected in series with the solenoid 44, and likewise the solenoid 55 and pilot motor B are connected in series with the solenoid 43. A conductor 58 is common to one terminal of each of the pilot motors A and B, and is connected to the stator main I. By virtue of the above connections, two parallel connections are established, one including the motor A and solenoids 44 and 56, and the other the motor B and solenoids 43 and 55. With the parts as shown, the ohmic resistance and impedance in the respective parallel circuits are substantially the same, and hence the current flow in each parallel branch will be substantially the same and both sides will be in electrical balance. Since the pilot motors A and B will each receive the same amount of current, they will rotate in opposite directions at substantially the same speed and consequently effect the rotation of the worms 27 and 28, we will say for example, in a counter-clockwise and clockwise direction respectively. Now since these worms are rotating in said direction and at the same speed, there will be no tendency of the gear 29 to actuate the rod 31 and rack gear 25 in an upward or downward direction. Thus far the principle of operation of the inductive mechanism has been given in order that a clear understanding of the same may be had, said principle of operation, etc., being clearly set forth in my Patents, No. 952,650, granted March 22, 1910, and No. 1,052,528, granted February 11, 1913.

The operation of the electric motor and power transmission mechanism which is controlled by the inductive apparatus and associated mechanism herein just described, will now be given. The parts as shown are at rest, and by moving the lever 38 a short distance to the left to bring the segment 45 into engagement with the segments 47, a circuit is closed for the winding 34 as follows: from the main I, conductor 56, segments 47 by way of segment 45, conductor 59, winding 34, and conductor 60 to main III. The winding 34 now receiving current will effect the closing of the switch W', thereby closing the circuit for the winding 32, which upon now receiving current will effect the closing of the switch W, thereby connecting the motor G with the supply mains. Now since the cores 41 and 42 are moved to the left, the current in the circuit containing the solenoids 44 and 56 and the motor A, will be greater than that in the parallel branch circuit containing the solenoids 43, 55 and the motor B. Under the present unbalanced condition of these parallel circuits, the motor A will run at a greater speed than the motor B, thus effecting an upward movement of the rack 25 a predetermined amount through the gear 29, and effecting the rotation of the cams 19 and 22 in a counterclockwise direction as indicated by the arrows. The rotation of the cams in said direction will effect a movement of the valve 14 a predetermined amount, and likewise move the wedge 10 to the right off center, thereby moving the ring 13 from a concentric to an eccentric position, thus tilting or inclining the head 6, which amount of tilting, determines the length of stroke of the pump pistons. Thus the initial movement of the hand lever 38 effects the closing of the circuit for the stator windings of the motor G. The motor will therefore start running at slow speed due to the resistance 35 in the rotor circuit, and the winding 37 receiving the full line potential will effect the operation of the accelerating switch H to automatically short circuit the starting resistance 35 in successive steps, and thereby accelerate the motor to normal full speed, which will remain practically constant irrespective of load variations thereon. Power now being available for the shaft 7, effects the operation of the pumping mechanism, whose piston stroke now being comparatively short, forces but a small quantity of fluid to the fluid motor F, at a great pressure, thereby effecting the rotation of the driven member 3, at a slow rate of speed, but with great force, as the torque of the fluid motor F under the present condition will be high, and as the speed of the fluid motor increases, the torque will vary in inverse ratio.

It will be noted here that the operation of the motor A to tilt the head 6 a predetermined amount through the differential gearing, etc., is controlled automatically, as it will be seen, that the rod 31 in this instance now being moved upwardly, effects the rocking of the lever 48 in a clockwise direction, thus projecting the core 54 farther into the solenoid 56 and withdrawing the core 53 from the solenoid 55. Thus the impedance of the circuit including the motor A is increased, while the impedance of the circuit including the motor B is decreased until finally an electrical balance between the parallel branches is again established and the motors A and B will again run at substantially the same speed and the differential gear and the parts connected therewith come to rest. Now it can be seen that as the lever 38 is moved farther, either in one single operation or a plurality of steps to its extreme left hand position, it causes the pumping mechanism to deliver fluid to the fluid motor F in increased quantities. Thus the fluid motor F will be accelerated to normal full speed.

It will be seen now that with the lever in its extreme left hand position and with the two parallel branch circuits in electrical balance, the cores 41 and 54 will be fully projected into the solenoids 43 and 56, respectively, and the cores 42 and 53 withdrawn from the solenoids 44 and 55 respectively. Thus said parallel branch circuits are electrically balanced and the two motors A and B will run at substantially the same speed with the differential gearing and the parts connected therewith at rest, and with the pump pistons operating at their maximum stroke. If the lever 38 is moved back to its initial or central position, the impedance in the solenoids 43 and 44 is again the same, but the current in each is not the same, since at this time the solenoid 56 contains a greater amount of core length than does the solenoid 55. Thus the impedance of the circuit containing the solenoids 55 and 43 is less than that of the branch circuit parallel thereto containing the motor A, and therefore the flow of current in the motor B is increased, while the flow of current through the motor A is correspondingly decreased. The result is that the motor B will operate at a higher speed than the motor A, thus causing a movement of the gear downwardly which movement restores the head 6 to its vertical position or in other words, to its normal position as shown concentric with the shaft 7. The valve 14 is also moved simultaneously with the head 6, to its central or closed position to cut off the fluid supply to the fluid motor, and the fluid is thus locked in said motor and acts as a brake for the same. The above noted operation of the motor B effects a movement of the rod 31 downwardly, which movement effects the rocking of the lever 48 in a counterclockwise direction, thus projecting the core 50 into the solenoid 55 and withdrawing the core 54 from the solenoid 56, and when the said cores assume the position as shown in the drawing, the system is again in electrical as well as mechanical balance, and it will be particularly noted that this operation is entirely automatic.

Now during this stopping period of the power transmission mechanism, that is when the lever 38 is returned to its initial position, it is the function of the dashpot switch W' to maintain a closed circuit for the winding 32 of the electro-magnetic main line switch W. Thus the latter is kept closed and the operation of the motor G is maintained for a predetermined period of time relative to the stopping period of the power transmission mechanism. In other words the arrangement is such that the electric motor G will be kept in operation if the stopping period of the power transmission mechanism is not excessive, or above the average time required as in the case of elevator service for example, to let passengers on and off. Thus in the application of the herein disclosed system to an elevator system, or steering gears, etc., there will be a great saving in current by keeping the electric motor in operation during the stopping period of the elevator car and the lower transmission mechanism, if said stopping period does not exceed the average, whereas, on the other hand, if the time of the stopping period exceeds a pre-determined amount, the circuit for the said motor will be automatically opened and the motor will stop. It will be particularly noted that when the lever 38 is moved to its initial position, the time period also maintains a supply of current to the motors A and B, whereby they cause the operation as heretofore just described, to return the head 6 and valve 14 to their normal position. It is to be here pointed out that the electric motor is adapted to run in one direction only, since the operation of the fluid motor F in reverse directions is effected by means of the pump P, which by moving the wedge 10 in a right or left hand direction past center, reverses the direction of flow of fluid.

Now to effect the operation of the fluid motor in a reverse direction to that just described, the lever 38 is moved toward the right, and from then on the principle of operation will be the same as heretofore just described, the difference being that in this instance, the motor B will actuate the differential gearing C to effect a downward movement of the rack gear 25 and the rod 31, thus effecting the rotation of the cam 22 to cause the operation of the pump in a reverse direction to the first described, thus reversing the direction of rotation of the driven member 3.

It is to be particularly noted that the pilot motors A and B through the differential gearing C, has freedom to rotate the cam 22 in either direction when the lever 11 is in its normal or vertical position as shown, without the cam slot 21 being effective. Such an arrangement is made necessary on account of the difficulty met with by the pilot motors in not stopping directly upon returning the lever 11 to its normal or vertical position.

It will now be seen that I have provided a novel system of control for variable speed power transmission mechanism having an alternating current electric motor as a prime mover, whereby the latter motor can be kept running constantly in one direction, and the power mechanism can be started, stopped and run at variable speeds and in either direction independently of the electric motor.

It is to be distinctly understood that my invention is broadly applicable to many of the various types of variable speed transmission mechanism having a torque and speed characteristic which vary in inverse ratio, and said mechanism being adapted to be driven by a prime mover, and it is to be further understood, that although I show herein a hydraulic transmission system, I wish not to be limited in the application of my invention to that particular type of power mechanism.

What I claim and desire to have secured by Letters Patent of the United States is:—

1. A driving and driven member, power transmission mechanism interposed between said members, and manually operable means having inductive apparatus associated therewith for controlling the driving member and power transmission mechanism conjunctively.

2. A driving and driven member, power transmission mechanism interposed between said members, and means comprising a master switch and inductive apparatus for controlling the driving member and power transmission mechanism conjunctively.

3. A non-reversing driving member, a driven member, power transmission mechanism interposed between said members, and means comprising a master switch and inductive apparatus associated therewith for conjunctively controlling the operation of the driving member in one direction and the power mechanism in either direction.

4. The combination with fluid power transmission mechanism, an alternating current motor for driving the same, and means comprising a master switch and inductive apparatus for controlling the power transmission mechanism and the alternating current motor conjunctively.

5. The combination with fluid power transmission mechanism, a non-reversing alternating current motor for driving the same, a master switch, inductive apparatus controlled by said master switch for controlling the operation of the power transmission in both directions, and means controlled by said master switch for controlling the alternating current motor in one direction.

6. The combination with fluid power transmission mechanism, an alternating current motor for driving the same, manually controlled inductive apparatus, means controlled by said apparatus for starting, stopping and accelerating the power transmission mechanism, and means for controlling the alternating current motor conjunctively with the power transmission mechanism.

7. The combination with fluid power transmission mechanism, a non-reversing alternating current motor for driving the same, a master switch, inductive apparatus associated therewith, means controlled by the inductive apparatus for effecting the starting, stopping, and variation in speed of the power transmission mechanism in both directions, means controlled by the master switch for starting and stopping the alternating current motor, and means for automatically regulating the speed of the latter.

8. The combination with fluid power transmission mechanism, an alternating current electric motor for driving the same, an electrically operated differential device, manually controlled inductive apparatus for controlling the differential mechanism to effect the starting, stopping and variation in speed of the power transmission mechanism at will, means for starting the electric motor simultaneously with the power transmission mechanism, and for automatically stopping the same if the stopping period of the power mechanism exceeds a pre-determined amount.

9. The combination with fluid power transmission mechanism, a non-reversing alternating current motor for driving the same, means comprising electro-responsive mechanism and a differential device for effecting the starting, stopping, and variation in speed of the power transmission mechanism in both directions, inductive apparatus for controlling said means, a master switch for conjunctively controlling the inductive apparatus and the electric motor, and means for automatically regulating the speed of the electric motor.

10. The combination with a fluid pressure motor, pumping mechanism adapted to supply said motor with fluid under pressure, an alternating current electric motor for driving the pumping mechanism, means comprising an electrically operated differential device for effecting the starting, stopping and variation in speed of the fluid pressure motor in either direction, inductive apparatus for controlling said means, a master switch for conjunctively controlling the inductive apparatus and the starting and stopping of the electric motor, and accelerating apparatus for automatically regulating the speed of the electric motor.

11. The combination with a fluid pressure motor, pumping mechanism adapted to supply said motor with fluid under pressure, a non-reversing alternating current motor for driving the pumping mechanism, means comprising a differential device wound for effecting the starting, stopping and variation in speed of the fluid motor in either direction, inductive apparatus for controlling said means, a source of alternating current supply, an electro-magnetic switch for controlling a circuit to said alternating current motor, and a master switch for conjunctively controlling the inductive apparatus and said electromagnetic switch.

12. The combination with a fluid pressure motor, pumping mechanism adapted to supply fluid under pressure to said motor, manually controlled inductive apparatus, and means controlled thereby for varying the torque and speed of the fluid motor in inverse ratio by varying the output of the pump.

13. The combination with a fluid pressure motor, pumping mechanism adapted to supply fluid under pressure to said motor, means comprising a differential device for varying the torque and speed of the fluid motor in inverse ratio by varying the output of the pumping mechanism, and manually controlled inductive apparatus for controlling the said means.

14. The combination with a fluid pressure motor, pumping mechanism adapted to supply fluid under pressure to said motor, an electrically operated differential device and means actuated thereby for varying the torque and speed of the fluid pressure motor in inverse ratio by varying the output of the pumping mechanism, and manually controlled inductive apparatus for controlling the electrically operated differential device.

15. The combination with a fluid pressure motor, pumping mechanism for supplying fluid under pressure to said motor, a source of alternating current supply, parallel circuits, an electric motor in each circuit, a differential device associated with the motors, mechanism controlled by said device for varying the torque and speed of the fluid motor in inverse ratio by varying the output of the pumping mechanism, and manually operable means for varying the relative inductance in said parallel circuits.

16. The combination with a fluid pressure motor, pumping mechanism adapted to supply fluid under pressure to said motor, means for directing fluid from the pump, and for simultaneously varying the output of the pump, a source of alternating current supply, parallel circuits, an electric motor in each circuit, a differential gear connected to each motor operable to actuate the first named means by a variation in the relative speeds of the motors, and means for varying the relative inductance in said parallel circuits.

17. The combination with a fluid pressure motor, pumping mechanism adapted to supply said motor with fluid under pressure, a non-reversing alternating current motor for driving the same, a source of alternating current supply, parallel circuits, an electric motor in each circuit, a differential gear connected to each motor, means actuated by said gear for varying the output of the pump, said means being arranged so that said gearing may have a certain amount of play in either direction at starting, and means for varying the relative inductance in said parallel circuits, 18. The combination with power transmission mechanism, an alternating current motor for driving said transmission mechanism, means comprising a master switch and inductive apparatus for starting the power mechanism and the alternating current motor simultaneously, and a timing device for automatically effecting the stopping of the alternating current motor in a pre-determined period of time after the stopping of the power transmission mechanism.

19. The combination with a driving member comprising an alternating current motor, a driven member, power transmission mechanism interposed betwen said members, means comprising a master switch and inductive apparatus for starting and stopping the alternating current motor and driven member, said means being arranged automatically to maintain the operation of the alternating current motor for a predetermined period of time, relative to the stopping period of the power transmission mechanism.

20. The combination with an alternating current motor and a driven member, power transmission mechanism interposed between said members, a master switch, inductive apparatus associated therewith, means controlled by the inductive apparatus for starting and stopping the power transmission mechanism, a source of alternating current supply, and means controlled by said switch for connecting and disconnecting the alternating current motor with the source of current supply, said means being arranged automatically to maintain a supply of current to said motor for a predetermined period of time, relative to the stopping period of the power transmission mechanism.

21. The combination with fluid power transmission mechanism, an alternating current motor for driving the same, a master switch, inductive apparatus associated therewith, means controlled by said inductive apparatus for starting and stopping the fluid power mechanism, said means comprising motors and a differential device connected to the motors, a source of alternating current supply an electromagnetic switch for connecting and disconnecting the alternating current motor with said source of current supply, and a timing device controlled by the master switch for controlling the operation of the electromagnetic switch to maintain a supply of current to the alternating current motor for a predetermined period of time when the power transmission mechanism is stopped by moving the master switch to its normal or central position.

22. The combination with fluid power transmission mechanism, an alternating current motor for driving the same, a master switch, inductive apparatus associated therewith, means controlled by said inductive apparatus for starting and stopping the fluid power mechanism, said means comprising motors and a differential device connected to the motors, a source of alternating current supply, an electromagnetic switch for connecting and disconnecting the alternating current motor with said source of current supply, and a timing device controlled by the master switch for controlling the operation of the electromagnetic switch to maintain a supply of current to the alternating current motor and the said differentially wound motors for a predetermined period of time when the master switch is moved to its normal or stop position.

In testimony whereof, I have signed my name to this specification in the presence of two subscribing witnesses.

AUGUST SUNDH.

Witnesses:
  WALTER C. STRANG,
  JAMES G. BETHELL.